Dec. 22, 1964  A. VOGT  3,162,748
METHOD FOR PRODUCING DIALS CARRYING PROJECTING SYMBOLS
Filed Nov. 6, 1961
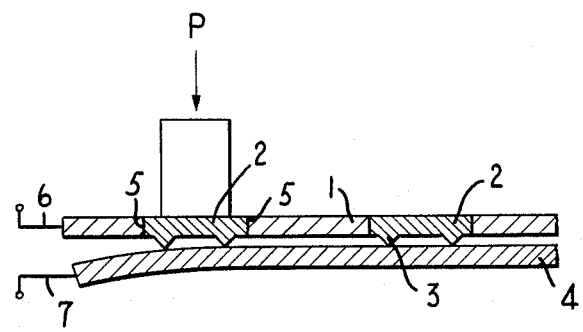

United States Patent Office 3,162,748
Patented Dec. 22, 1964

3,162,748
METHOD FOR PRODUCING DIALS CARRYING
PROJECTING SYMBOLS
André Vogt, 63 Rue Jacob Brandt,
La Chaux-de-Fonds, Switzerland
Filed Nov. 6, 1961, Ser. No. 150,204
Claims priority, application Switzerland, Nov. 9, 1960,
12,509/60
5 Claims. (Cl. 219—117)

Various methods for securing time or the like symbols in relief over dials are known, chiefly in the case of clockwork dials. According to a number of the known methods, the symbols are secured through welding by means of an electric current or of supersonic waves onto the finished or half-finished dials. After the welding the symbols are finished, for example, by faceting. However, it has not yet been possible to weld on such finished dial symbols which are themselves finished, that is which do not require after the welding step a further finishing operation such as faceting.

The invention has for its object a method for welding finished symbols on a dial which is itself finished. The drawing is a fragmentary side elevation view of a diagram illustrating one method of carrying out the invention.

According to the invention, the energy required for welding the symbol is caused to pass through the edge of the symbols or indicia so as not to damage their outer visible surface. The energy applied edgwise into the symbol may pass out of the latter, either edgewise or through the dial. More specifically and in accordance with a preferred embodiment, I begin, for instance, by first cutting the symbol out of a strip for example, a strip 1 of a metal such as brass. During this cutting operation, I stamp or swage small points out of the rear surface of the symbols. The symbols are left in or reinserted into the strip 1 as shown out of which they have been cut and which is embedded in a carrier of plastic material 5. If desired the indicia can be made of a thicker strip, not shown, than strip 1 and this strip thus prepared is wound over a drum moving in registry with chisels adapted to facet the symbols by engaging the strip and its plastic coat. The faceting is executed in a final manner, so as to require no further touching up or finishing.

The strip 1 is then taken off the drum and is a carrier for the indicia and is then fed into an electric welding machine in which it is positioned so that one of the symbols or time indicating indicia carried by the strip may be superposed accurately over the location of the dial 4 on which it is to be secured through welding. A lever, shown diametrically the end of which is made of slightly elastic plastic or the like material, so as not to damage the finished surface of the symbol, is caused to engage the symbol's surface and to urge elastically the symbol against the dial by applying pressure in the direction of the arrow P. The electric welding current is then applied through leads 6 and 7 so that it passes first into the strip and then into the actual symbol through the edge of the symbol and lastly out of said symbol into the dial through the welding points 3 provided by stamping for this purpose. The cross-sectional area of these points 3 is much smaller than that of the edge of the symbol 2. These points are obviously heated to a higher extent than any other section of the symbol and melt. During the welding operation, the lever or the like member urges elastically under slight pressure the symbol towards the dial, so as to compensate for the clearance produced by the melting of the points. When the welding is completed the strip is shifted away so as to leave in position the symbol secured to the dial.

My improved method allows therefore, by introducing the welding energy through the edge of the symbol, preventing any damage of the finished surface of said symbol, whereby it is consequently possible to actually finish the outer surface of the symbol before the welding operation. This leads to a considerable and unexpected rationalizing of the welding methods hitherto resorted to.

Of course, said method is by no means limited to the above disclosure. Thus, the welding may be executed through the agency of supersonic waves, or else, through electronic means; various welding methods may also be associated and, similarly, the symbols may be obtained or finished by other means, and they may also be secured on any known type of dials, whether clockwork dials or dials intended for other purposes.

What I claim is:

1. A method for welding a symbol on a finished electrically conductive dial, the steps consisting in cutting the symbols out of a strip of metal, providing on the rear sides of the symbols narrow projections, faceting the front side of the symbols, positioning the strip carrying the symbols in their original location with reference thereto to make a symbol register with the location to be occupied by said symbol on the dial, feeding electric current through the strip into the edge of the last-mentioned symbol through the latter and its projections, said current passing out through the dial, urging elastically said symbol against the dial during the welding, and consequent melting of the projections, and removing the strip while leaving the symbol in position on the dial.

2. A method for permanently securing symbols on a finished watch dial having a major face surface comprising, superimposing the symbols on the face of the dial and holding them in an electrically conductive carrier along a peripheral edge thereof in electrical contact with said carrier, applying pressure thereto, holding said symbols and major face surface in intimate contact, during the application of said pressure applying current flow to said dial and to said carrier to thereby apply current flow peripherally to a side edge of each of said symbols to permanently bond said symbols to said dial face surface.

3. A method for permanently securing hour indicia on a major face surface of a watch dial comprising, providing a dial completely finished but without time-indicating indicia thereon, providing an electrically conductive carrier having elements thereon comprising time-indicating indicia each releasably held along a peripheral edge by said carrier in contact with said carrier in position to be permanently secured to said dial face and for releasably positioning said indicia on said face, positioning said carrier with said indicia and said face surface making contact, applying pressure to cause said indicia and face surface to make intimate contact, and during the application of said pressure and while said face and indicia are in intimate contact applying electrical energy to at least said carrier to cause it to apply electrical energy on the edge surfaces of said indicia to permanently bond said indicia to said dial face.

4. A method for permanently securing hour indicia on a major face surface of a watch dial comprising, providing a dial completely finished but without time-indicating indicia thereon, providing a conductive carrier having elements thereon corresponding to time-indicating indicia each releasably held along a peripheral edge by said carrier in contact with said carrier in position to be permanently secured to said dial face and for releasably positioning said indicia on said face in spaced, relative positions, positioning said carrier with said indicia and said face surface making intimate contact, applying pressure to cause said indicia and face surface to make intimate contact, during the application of said pressure and while said face and indicia are in intimate contact applying electrical current flow to said carrier thereby to apply current flow on the edge surfaces of said indicia to permanently weld said indicia to said dial face, and removing said carrier.

5. A method for permanently securing hour indicia on a major face surface of a watch dial comprising, providing a dial completely finished but without time-indicating indicia thereon, providing a carrier having elements thereon comprising time-indicating indicia to be permanently secured to said dial face and for releasably positioning said indicia on said face, said carrier having surfaces for releasably holding said indicia and making contact only with the side edge surfaces of said indicia, positioning said carrier with said indicia and said face surface making contact, applying pressure to cause said indicia and face surface to make intimate contact during the application of said pressure and while said face and indicia are in intimate contact applying electrical current flow to said carrier to apply electrical current flow through the edge surfaces only of said indicia to permanently weld said symbols to said dial face, and removing said carrier.

References Cited by the Examiner
UNITED STATES PATENTS

| | | | |
|---|---|---|---|
| 2,087,530 | 7/37 | Potchen | 219—93 |
| 3,051,826 | 8/62 | Avila | 219—107 X |

RICHARD M. WOOD, *Primary Examiner.*